UNITED STATES PATENT OFFICE.

WALTER ARTHUR, OF SCHENECTADY, NEW YORK, ASSIGNOR TO GENERAL ELECTRIC COMPANY, A CORPORATION OF NEW YORK.

REFRACTORY MATERIAL.

1,072,413.      Specification of Letters Patent.     Patented Sept. 9, 1913.

No Drawing.     Application filed September 6, 1912. Serial No. 718,824.

*To all whom it may concern:*

Be it known that I, WALTER ARTHUR, a citizen of the United States, residing at Schenectady, county of Schenectady, State of New York, have invented certain new and useful Improvements in Refractory Material, of which the following is a specification.

The present invention relates to a product useful for example, as a heat insulating material, suitable particularly for use in electric furnaces, ovens, fireless cookers, or any other purpose where a refractory, inert material of low heat conductivity is required.

In accordance with my invention, a charge comprising silica, carbon, an aluminum silicate such as fire clay, and in some cases also, manganese oxid is submitted to a temperature at which reduction takes place with the formation of vaporous products which condense in the form of soft, coherent, somewhat felty masses, containing silicon, carbon, oxygen and aluminum, or manganese, or both. This new product which is valuable as heat insulation constitutes part of my invention.

According to one modification of the invention, a mixture by weight of about two parts of silica, one part of carbon such as crushed coke, two parts of burnt fire clay is heated in an electric furnace, conveniently in a so-called "smothered arc" furnace with fire-brick walls, the mixture being placed between and around two opposing carbon electrodes, carrying the current and out of contact with each other. In order to condense the resulting sublimed product, a housing is preferably placed around the furnace, which housing acts as a condensing chamber.

A soft, coherent, and somewhat felty material is condensed. It is light dirty brown or grayish in color. The material will withstand a temperature of about 900° to 1100° C. or even higher without deterioration or fusion. Its specific thermal resistance is from 900 to 1200 thermal ohms per inch cube and the temperature resistance coefficient is very small. Chemically the material appears to contain silicon, carbon, oxygen, and small amounts of metals, particularly, aluminum.

In some cases manganese oxid is added to the charge to produce a harder product which is firmer to the touch. For example, I may use 4 parts silica, 4 parts fire-brick, 2 parts carbon and 1 part manganese oxid. This product tends to harden upon standing. When containing manganese the color is a bluish gray.

Not only is this material of especial value because of its low heat conductivity and refractoriness but I find that it may be compressed to a considerable degree without increasing its heat conductivity materially. This property enables it to be packed firmly in heating or refrigerating devices without loss of heat insulating value.

What I claim as new and desire to secure by Letters Patent of the United States, is:—

1. A soft, coherent, refractory sublimation product, consisting largely of fine particles felty in texture, having a specific thermal resistance of about 900–1200 thermal ohms per inch cube and containing silicon, oxygen, carbon, and small amounts of metal.

2. A coherent, bluish-gray refractory material, having a low specific thermal resistance, a low thermal temperature coefficient, containing silicon, oxygen, carbon, and manganese, and having the property of hardening upon standing.

In witness whereof, I have hereunto set my hand this 4th day of September 1912.

WALTER ARTHUR.

Witnesses:
    BENJAMIN B. HULL,
    HELEN ORFORD.